June 11, 1968  A. TAVERA  3,387,553

PREPACKED COFFEE PACKAGE

Filed Oct. 24, 1965  2 Sheets-Sheet 1

INVENTOR.
Antonio Tavera
BY
Attorneys

June 11, 1968     A. TAVERA     3,387,553
PREPACKED COFFEE PACKAGE
Filed Oct. 24, 1965     2 Sheets-Sheet 2
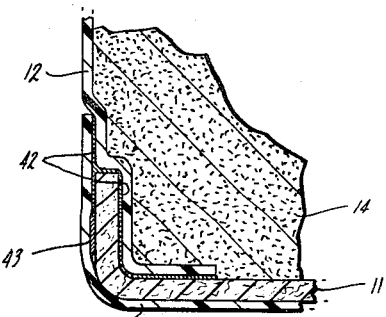
Fig. 5
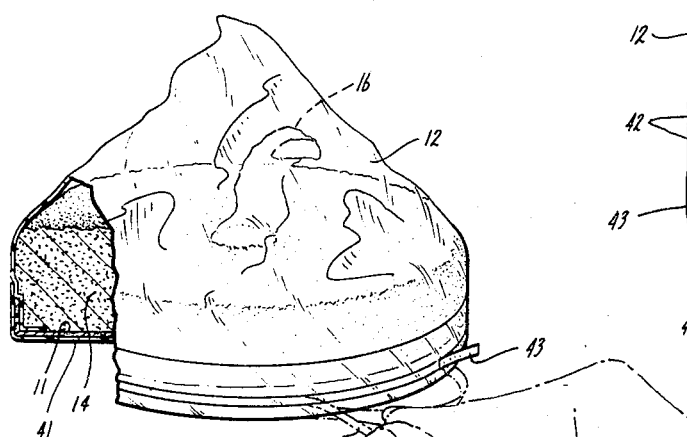
Fig. 4
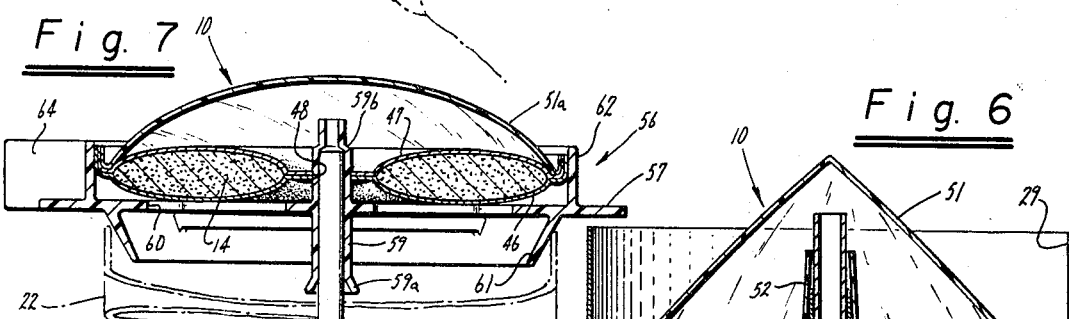
Fig. 7
Fig. 6
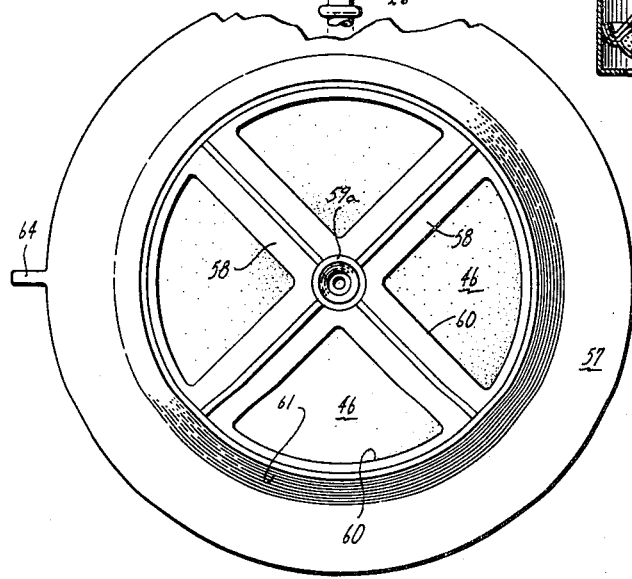
Fig. 8
INVENTOR.
Antonio Tavera
BY
Attorneys

United States Patent Office 3,387,553
Patented June 11, 1968

3,387,553
PREPACKED COFFEE PACKAGE
Antonio Tavera, Rte. 1, Box 1386,
Elk Grove, Calif. 95624
Filed Oct. 24, 1965, Ser. No. 504,702
13 Claims. (Cl. 99—295)

ABSTRACT OF THE DISCLOSURE

Disposable prepacked collapsible coffee package for use with a coffee percolator.

---

This invention relates to a prepacked coffee package and more particularly to a disposable prepacked coffee cartridge.

At the present time there is considerable need for a prepacked coffee package which can be readily disposed of after use to eliminate the necessity of the housewife having to remove coffee grounds from the percolator after the percolator has been used for making a pot of coffee. Prepacked containers heretofore provided have not been completely satisfactory for a number of reasons. Some of the cartridges have required special coffee pots, whereas others have been unduly expensive and bulky so that they have not been accepted commercially. There is, therefore, a need for a new and improved prepacked coffee package.

In general, it is an object of the present invention to provide a prepacked coffee package which is relatively simple and inexpensive in construction.

Another object of the invention is to provide a prepacked coffee package of the above character which can be utilized with a conventional coffee percolator.

Another object of the invention is to provide a prepacked coffee package of the above character which is formed of a flexible material to permit the package to collapse so that it will require very little space for packaging and storage.

Another object of the invention is to provide a prepacked coffee package of the above character which makes it possible to produce coffee of a substantially improved quality.

Another object of the invention is to provide a prepacked coffee package of the above character which may itself form a sealed package for the ground coffee and which may be evacuated to provide a vacuum pack to preserve the freshness of the ground coffee.

Another object of the invention is to provide a prepacked coffee package of the above character in which the seal can be readily removed.

Another object of the invention is to provide a prepacked coffee package of the above character which can be used for making coffee rapidly by using hot water.

Another object of the invention is to provide a prepacked coffee package of the above character in which all of the vapor, steam and hot water rising through the stem of the percolator must pass through the ground coffee.

Additional objects of the invention will appear from the following description in which the preferred embodiments are set forth in detail in conjunction with the accompanying drawings.

Referring to the drawings:

FIGURE 4 is an isometric view with a certain portion broken away of another prepacked coffee package embodying the present invention.

FIGURE 5 is an enlarged cross-sectional detail view of the package shown in FIGURE 4.

FIGURE 6 is a cross-sectional view of another prepacked coffee package embodying the present invention.

FIGURE 7 is a cross-sectional view of still another embodiment of a prepacked coffee package embodying the present invention.

FIGURE 8 is a top plan view of the adapter plate utilized in FIGURE 7.

Figures 1, 2, 3:
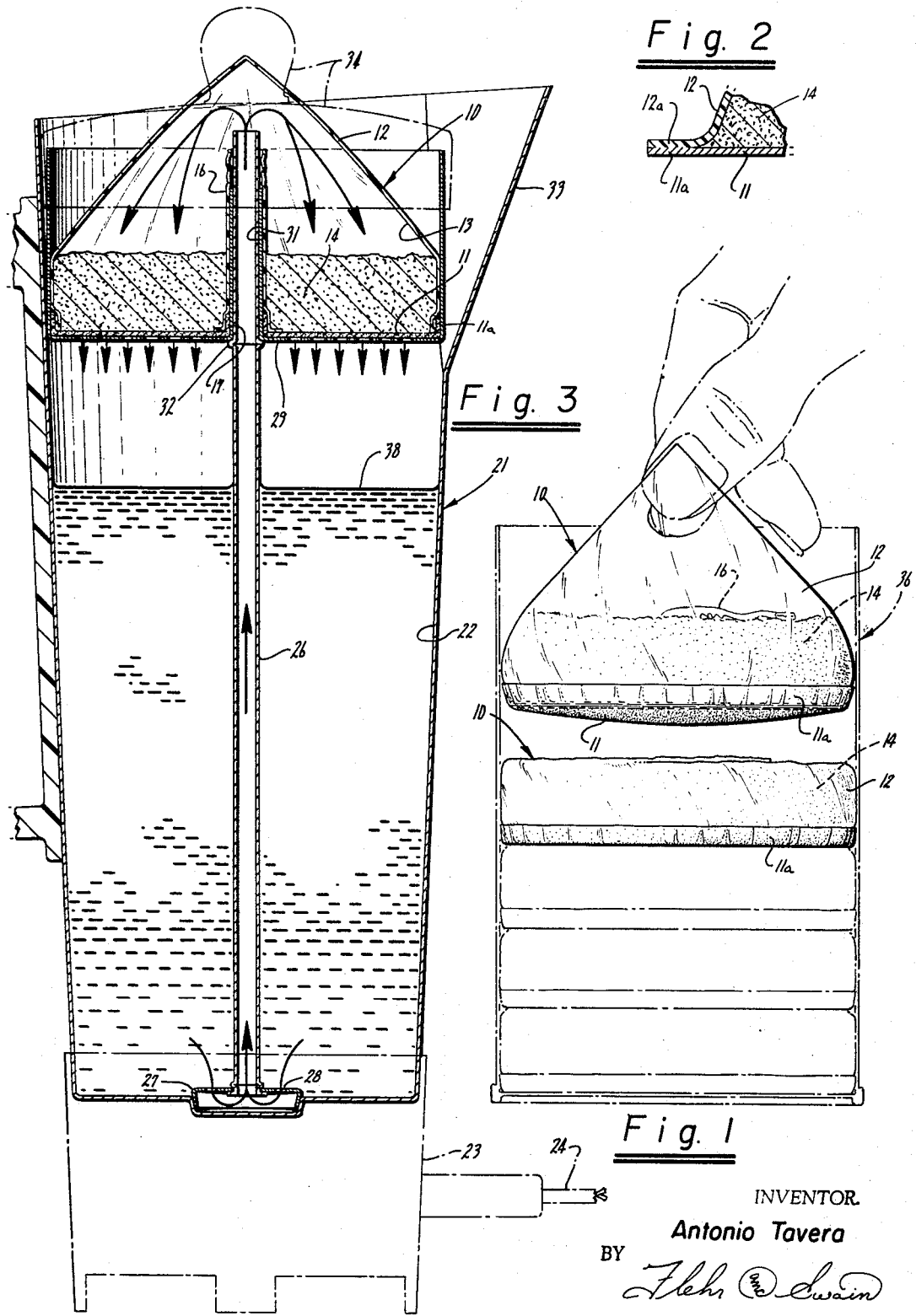
FIGURE 1 is a side elevational view of a prepacked coffee package incorporating the present invention and showing a plurality of the packages packed in a container which was hermetically sealed.
FIGURE 2 is an enlarged cross-sectional detail view of the package shown in FIGURE 1.
FIGURE 3 is a cross-sectional view of a coffee percolator showing one of the prepacked coffee packages disposed in the same and being utilized for producing coffee.

In general, the prepacked coffee package is adapted for use with a coffee percolator of the type which has a hollow riser or stem. The package is comprised of a relatively porous, flexible bottom filter member and a substantially impervious, relatively flexible membrane having its outer margin secured to the outer margin of the porous bottom filter member to form an enclosure which is adapted to contain ground coffee. Ground coffee is disposed within the enclosure. The bottom member is provided with a generally centrally disposed opening. A hollow flexible stem is mounted on the bottom member in registration with the hole and extends upwardly into the enclosure and above the ground coffee.

As shown in the drawings, the prepacked coffee package consists of a flexible, relatively porous disc-like bottom filter member 11 which can be formed of any suitable type of material such as cotton. The principal requirement is that the filter should be relatively strong and should not break when it is wet. The filter member can be of any desired shape. However, as shown in the drawings, the filter member is preferably circular in order to fit into conventional percolators as hereinafter described. A substantially impervious, relatively flexible membrane 12 overlies the disc-like filter member 11 and has its outer margin 12a secured to the outer margin 11a of the disc-like filter member. The membrane 12 can be formed of any suitable material such as a clear flexible plastic which is relatively durable and which can readily withstand the temperature of boiling water. One plastic found to be suitable is "Durafilm" made by Dow which is a combination of Mylar and polyethylene.

When the membrane 12 is formed of plastic, the outer margin of the same can be secured to the outer margin of the filter member merely by heating the portion of the membrane to be bonded to the filter member to form a heat seal. In other words, the filter member 11 and the membrane 12 can be sealed together by heat to provide a bond between the filter member and the membrane which will withstand boiling water. Alternatively, if desired, a suitable adhesive may be used for making the bond.

The membrane 12 can be of any desired shape such as an inverted truncated cone as shown in FIGURE 1. It is, however, necessary that the membrane be of sufficient size so that the desired amount of ground coffee can be prepacked in the enclosure 13 formed between the filtering member 11 and the membrane 12. Although the invention herein described is principally intended for use with coffee, it is readily apparent that other granulated beverages can also be packed in such a package.

A hollow step 16 is provided within the enclosure 13 and extends upwardly from the bottom filter member 11. The stem 16 is preferably formed of a flexible material and can be formed of the same material that the membrane 12 is formed. The stem 16 is generally cylindrical in shape. However, if desired, the stem can be formed so that it is tapered slightly inwardly in an upward direction with its upper end being open and with the lower end of the same being in registration with an opening or hole 17 centrally disposed in the filter member 11. The lower portion of the stem 16 is provided with a flange-like portion 16a which is bonded to the inner margin of the filter member 11 by suitable means such as a heat seal. To ensure that ground coffee will not spill from the package, the upper end of the stem 16 can be twisted slightly or sealed tightly with heat.

As shown particularly in FIGURE 3, the prepacked coffee package is particularly constructed so that it can be utilized with a conventional percolator such as the percolator 21 shown in FIGURE 3. As is well known to those skilled in the art, such a percolator consists of a pot or chamber 22 mounted upon a base 23 which contains a heating element (not shown) which is connected by a cord 24 to an electrical outlet. An upright hollow stem or riser 26 is mounted within the pot 22 and is provided with a base 27 having openings 28 therein. A perforated basket 29 is mounted on the upper end of the stem or riser 26. As is well known to those skilled in the art, such a basket is normally formed of perforated metal and takes the form of a cylinder in which the top end is open and which is provided with a centrally disposed sleeve 31 that is adapted to fit over the upper end of the riser 26 so that the upper end of the riser 26 extends above the sleeve. The riser or stem 26 is provided with a shoulder 32 which establishes the lowermost position for the basket 29. The percolator 21 is also provided with a spout 33 and a cap 34.

As also can be seen from FIGURE 3, the prepacked coffee package 10 is formed so that the diameter of the package is substantially the same as the inner diameter of the basket 29 and that the flexible stem 16 of the package slips over the sleeve 31 of the basket and forms a relatively tight fit therewith. The size of the membrane 12 is also such that the top of the membrane, when extended, is substantially above the upper part of the stem or riser 26 of the percolator.

When the prepackaged coffee packages 10 are of a type in which the package itself is not hermetically sealed, they are preferably stored in a suitable container such as a container 36 which can be hermetically sealed. It can be seen from FIGURE 1 that the construction of the packages 10 is such that they can readily be stacked one above another in the container 36 so that a relatively large number of the packages can be packed in a single container. The packages 10 also lend themselves to this type of packing because they are formed of flexible materials which permits a relatively high packing density within the container 36.

In order to describe the use of the prepacked coffee packages, let is be assumed that the coffee packages have been prepacked with sufficient ground coffee to make eight cups of coffee in a conventional percolator. The percolator 22 is then filled with sufficient water for eight cups of coffee as, for example, to the waterline 38 as shown in FIGURE 3. Although the percolator can be filled with cold water, it has been found that it is preferable to fill the percolator with relatively hot water in order to speed up the coffee making operation. The stem 26 in the basket 29 is then put in place within the percolator and the coffee package is lowered gently over the riser 26 and the sleeve 31 of the basket 29 so that the riser enters the opening 17 in the flexible stem 16 so that the stem 16 is gradually raised from its normally relaxed condition, as shown in FIGURE 1, to a position in which it is substantially erect and surrounds the sleeve 31 to form a relatively close fit with the sleeve. At the same time, the package is lowered into the basket so that filter member 11 rests upon the bottom of the basket. In this condition, the membrane 12 lies in a generally relaxed position over the top of the riser 26. Since the membrane 12 is impervious or substantially impervious, it is not necessary to utilize the cover 34 of the percolator.

As soon as the percolator is plugged in, hot water and steam are almost immediately forced up the riser 26 and is discharged therefrom over the top of the ground coffee within the package 10 and begins to flow downwardly through the ground coffee and through the filter member 11 and through the perforations in the basket down into the pot 22. As soon as the ground coffee within the package has been wetted substantially by the boiling water, which occurs quite rapidly because channeling of the water in the coffee does not occur, it has been found that the hot water tends to build up above the ground coffee because the ground coffee impedes the flow of the hot water through the same. For this reason, within a few minutes after percolation of the percolator begins, the steam which is created establishes a positive pressure within the enclosure 13 to cause the membrane 12 to balloon upwardly and outwardly into a relatively rigid form as shown in FIGURE 3 of the drawings. This increased pressure within the enclosure serves to accelerate the percolation of the hot water through the ground coffee and the extraction of the coffee flavor therefrom. Thus, it can be seen that the membrane 12 assures that all of the water coming up through the riser 26 and also the steam which is condensed is forced downwardly through the ground coffee to provide a clean, clear coffee without grounds. Because the membrane 12 forms a good seal with the filter paper, there is no opportunity for water to build up over the ground coffee and overflow the basket and to drain down into the pot. The flexible stem 16 surrounds the sleeve 31 and collapses against the sleeve 31 to form a seal therewith and assures that none of the vapor, steam or hot water passing upwardly through the riser 26 into the enclosure 13 will pass out of the enclosure 13 without first percolating through the ground coffee contained in the package. Because the stem 16 is flexible, it will form a seal with risers of various sizes. Thus, no hot water will escape down the sides of the basket or down the sleeve of the basket.

The prepacked coffee package 10 forces the water relatively uniformly through all the ground coffee in the package without channeling so that all the grounds of coffee are uniformly exposed to the hot water. Because of this reason, it has been found that it is possible to make excellent coffee within a very short period of time without any bitterness and with less ground coffee.

During percolation, it has been found that near the end of the percolation cycle that pressure will repeatedly build up within the enclosure 13 and then will be released as the water is forced to percolate through the coffee grounds.

After the percolaiton has been carried on for a sufficient period of time, the heating element of the conventional percolator will automatically be turned off to stop any further water from being forced upwardly through the riser 26. Thereafter, the prepacked coffee package 10 can be readily removed by grasping the upper portion of the membrane 12 and lifting the same off of the riser 26, after which it can be discarded in its entirety.

If the percolator is of a type which does not build up sufficient pressure in the riser 26 to force the water through the coffee grounds, the hot water may stop rising in the riser 26. To overcome this, it may be necessary to provide several relatively small punctures in the membrane 12 to reduce the pressure within the enclosure 13 and to thereby permit the hot water to rise again in the riser 26. Since the holes which are placed in the membrane 12 are relatively small, none of the coffee grounds will escape through these holes.

Another embodiment of the prepacked coffee package is shown in FIGURES 4 and 5 and is substantially identical to the embodiment shown in FIGURES 1 and 2, with the exception that the package itself is hermetically sealed. This is accomplished by providing an additional flexible impervious bottom wall 41 which underlies the filter member 11. This bottom member 41 can be formed of the same material as the membrane 12 and can be secured to the member 11 in a suitable manner such as by heat sealing or by the use of an adhesive 42 which can withstand boiling water. It can be seen that the construction is such that the bottom member 41 and the membrane 42 form a complete hermetically sealed enclosure for the ground coffee within the package. Alternatively, the bottom member 41 and the membrane 12 can be heat sealed together through the pores of the filter member 11. In order to facilitate use of the package, a tear strip 43 of a conventional type is provided which can be readily removed to separate the bottom member 41 from the package. As soon as the bottom member has been removed, the filter member 11 is exposed so that the package can be placed in a coffee basket in the manner heretofore described for the embodiment of the package shown in FIGURES 1 and 2. The operation and use of the package is identical to that hereinbefore described. The package is provided with a flexible stem 16 which forms a seal around the sleeve 31 of the basket. The transparnet membrane 12 makes it possible to observe the percolating operation as it takes place in the percolator.

If desired, the sealed package shown in FIGURES 4 and 5 can be evacuated to vacuum pack the ground coffee therein to preserve the freshness of the ground coffee. In such event the membrane 12 will collapse over the coffee to reduce the space required for the packaging and storage of the package.

Still another embodiment of the prepacked coffee package 10 is shown in FIGURE 6. This embodiment consists of a pair of disc-like filter members 46 and 47 which have their outer margins bonded together in a suitable manner such as by means of an adhesive. The filter members 46 and 47 are provided with centrally disposed holes 48 which are in registration with each other. The inner margins of the filter members adjacent the holes 48 are also bonded together in a suitable manner such as by means of adhesive so that an annulus 49 which is substantially oval in cross-section is provided and in which ground coffee 14 is disposed.

A flexible, substantially impervious membrane 51 is disposed above the filter members 46 and 47 and has its outer margin secured to the outer margin of the filter members in a suitable manner such as by means of heat sealing. As shown in FIGURE 6, this membrane 51 can also be in the form of an inverted cone. A flexible sleeve 52 formed of an impervious material is provided in registration with the holes 48 and is secured to the inner margins of the filter members 46 and 47 by suitable means such as heat sealing.

The use of the prepacked coffee package shown in FIGURE 6 is substantially identical to that hereinbefore described for the other embodiments. The principal advantage of the embodiment shown in FIGURE 6 is that the ground coffee is contained between two layers of filter paper and hence there is no opportunity for the same to escape. As can be seen from FIGURE 6, the package is also of a type which can be readily used with a conventional percolator.

Still another embodiment of the prepacked coffee package is shown in FIGURE 7. It is very similar to the embodiment shown in FIGURE 6, with the exception that the membrane 51a has a configuration which is substantially hemispherical rather than in the form of an inverted cone. The package 10 in FIGURE 7 is shown mounted upon an adapter plate 56 which makes it possible to utilize the same size package with various sizes of coffee percolators. The adapter plate is formed as one piece and is provided with a circular disc-like portion 57 having diametrically extending ribs 58 with sector-shaped openings 60 formed therebetween. A hollow stem extension 59 is centrally disposed in the disc 57 and is supported by the ribs 58. This extension 59 is provided with an outwardly extending lower portion 59a and an inwardly and upwardly inclined portion 59b. The extension 59 is adapted to receive the upper portion of the riser or stem 26 of a conventional percolator. The conventional basket may or may not be removed.

The adapter plate 56 is also provided with a downwardly and inwardly extending lip 61 which is adapted to fit within the upper portion of a coffee pot 22. The adapter plate 56 is also provided with an upwardly extending cylindrical rim 62 which is adapted to receive the package 10 as shown particularly in FIGURE 7. The adapter plate 56 is also provided with a handle 64 to facilitate its removal from a coffee pot or placement on a coffee pot.

The use of the prepacked coffee package with the adapter plate 56 is substantially identical to that hereinbefore described. The adapter plate is placed upon the riser 26 in the coffee pot 22, after which the prepacked coffee package can be placed upon the extension 59 of the adapter plate and seated within the vertically extending rim 62. After this has been accomplished, the package will function in the same manner as the other packages hereinbefore described.

It is apparent from the foregoing that I have provided a prepacked coffee package which has many advantages. Its construction is such that it can be economically manufactured. In addition, its construction is such that it can be made so that the package itself is hermetically sealed or evacuated, or that it can be readily packed in hermetically sealed or vacuum packed containers. Its construction is also such that it can be utilized with conventional percolators without modification of the percolators. The package can be constructed to contain various quantities of coffee and can be made in various sizes so that they can be utilized on all types and sizes of percolators. In order to reduce the number of sizes required, the package can be made with a diameter of the smallest basket so that it will fit in all larger size baskets. This is possible because the package holds ground coffee and water independent of the percolator basket.

Although the prepacked coffee package has been described with the filter member being on the bottom, it has been found that the package will also perform its function if the lower extremities of the side walls alone are formed of a porous material to provide the filter member for the package. The water passing through the coffee grounds will merely pass through the filter member and then through the bottom and side walls of the percolator basket.

I claim:

1. A prepacked coffee package for use with a coffee percolator of the type having a support plate and a stem extending through the support plate, said package comprising an enclosure adapted to rest upon the support plate and having a bottom section at least a part of which is formed of a filter member and a substantially impervious, relatively flexible collapsible membrane secured to the bottom section to provide a closed chamber, ground coffee disposed in the chamber, said membrane being of a size so that it can be raised a substantial distance above the ground coffee in the chamber, and a flexible collapsible hollow open ended stem mounted in the bottom section wall and extending upwardly into the chamber and through and above the ground coffee in the chamber, said flexible stem being adapted to receive the stem of the percolator and to permit it to pass therethrough.

2. A package as claim 1 wherein said bottom section is entirely formed as a filter member and wherein the outer margin of the filter member is secured to the outer margin of the membrane.

3. A package as in claim 1 together with an additional removable flexible impervious member covering the filter member and secured to the membrane to form in conjunction with the membrane a sealed chamber for the coffee.

4. A package as in claim 1 together with an additional filter member disposed over the ground coffee and within the substantially impervious membrane.

5. A package as claim 1 wherein said membrane is in the form of a substantially transparent plastic.

6. A package as in claim 5 wherein said membrane is substantially in the form of an inverted cone.

7. A packaged as in claim 2 together with an additional removable flexible impervious member covering the filter member and secured to the membrane to form with the membrane a sealed enclosure for the coffee, said enclosure being evacuated to preserve the freshness of the coffee.

8. A prepacked coffee package for use with a coffee percolator of the type having a hollow riser, said package comprising a relatively porous, flexible bottom filter member, a substantially impervious, relatively flexible collaspible membrane having its outer margin secured to the outer margin of the porous bottom filter member to form an enclosure, the bottom filter member being formed with a centrally disposed opening, a hollow stem formed of a flexible collapsible material secured to the bottom filter member in registration with the opening in the bottom filter member, and ground coffee disposed within the enclosure, said stem extending upwardly through and above the coffee in the enclosure, said membrane being expandable to a position to provide a space above ground coffee, said stem being adapted to receive the riser of the percolator and to permit it to pass therethrough into said space.

9. A package as in claim 8 wherein said filter member is formed of a cloth-like material and wherein said membrane is in the form of a substantially clear plastic.

10. A package as in claim 8 adapted to be used with a percolator having a perforate basket mounted on the riser, said package having a size to be fitted within the basket.

11. In the combination of a prepacked coffee package and an adapter plate for use with a coffee percolator having a riser, the prepacked coffee package comprising a relatively porous, flexible bottom filter member, a substantially impervious, relatively flexible membrane having its outer margin secured to the outer margin of the porous bottom filter member to form an enclosure, ground coffee disposed within the enclosure, and a flexible stem mounted in the bottom filter member and extending upwardly into the enclosure, said adapter plate comprising a disc-like member having openings therein and a vertically extending rim adapted to receive said package.

12. A combination as in claim 11 wherein said adapter plate is provided with a plurality of diametrically extending ribs and a tubular extension supported by said ribs, said tubular extension being adapted to receive the riser.

13. In the combination of a prepacked coffee package and an adapter plate for use with a coffee percolator having a riser, the prepacked coffee package comprising a bottom section at least a portion of which is formed of a filter member, a substantially impervious, relatively flexible collapsible membrane having its outer margin secured to the outer margin of the bottom section to form an eclosure, ground coffee disposed within the enclosure, and a flexible collapsible stem mounted in the bottom section and extending upwardly and through the coffee in the enclosure, said adapter plate comprising a disc-like member having openings therein and a tubular extension carried thereby, said tubular extension being adapted to receive the riser.

References Cited
UNITED STATES PATENTS

| | | | |
|---|---|---|---|
| 1,454,739 | 5/1923 | Holland | 99—77.1 |
| 2,460,735 | 2/1949 | Carroll | 99—77.1 |
| 2,778,739 | 1/1957 | Rodth | 99—295 X |
| 3,083,100 | 3/1963 | Baran | 99—295 X |
| 3,119,694 | 1/1964 | Gauld | 99—77.1 |
| 3,159,096 | 12/1964 | Tocker | 99—77.1 |
| 3,208,854 | 9/1965 | Hediger et al. | 99—77.1 |

ROBERT W. JENKINS, *Primary Examiner.*